Aug. 6, 1974 K. R. DAHLMAN Re. 28,098

GRASS CUTTING MACHINES

Original Filed March 12, 1962

INVENTOR.
Karl R. Dahlman
BY
Watson, Cole, Grindle & Watson
ATTORNEYS

United States Patent Office

Re. 28,098
Reissued Aug. 6, 1974

28,098
GRASS CUTTING MACHINES

Karl R. Dahlman, Malmo, Sweden, by Flymo Societe Anonyme, Malmo, Sweden, assignee Original No. 3,110,996, dated Nov. 19, 1963, Ser. No. 178,883, Mar. 12, 1962. Application for reissue Feb. 22, 1973, Ser. No. 334,562
Int. Cl. A01d *73/00*
U.S. Cl. 56—12.8 23 Claims

Matter enclosed in heavy brackets [ ] appears in the original patent but forms no part of this reissue specification; matter printed in italics indicates the additions made by reissue.

ABSTRACT OF THE DISCLOSURE

A power mower with a rotary cutter blade rides by ground effect on a cushion of air by means of a radial air impeller rotated with the blade to bring air in at the top of a hood and expel it at the outer edges of the hood around the ends of the cutter blade.

This invention relates to a grass cutting machine, e.g. for use as a lawn mower or a crop harvesting machine.

More particularly, the invention relates to a grass cutting machine of the type having a power operated cutter. Such grass cutting machines are usually constructed with a frame surrounding the operating area of the cutter, the said frame being supported on rollers to keep the cutter at a suitable distance above the ground. The said frame and rollers are of considerable inconvenience in various respects. Thus, they form an obstacle to the cleanness of cutting around trees and along walls, borders of a lawn etc. Moreover, the frame and rollers add considerably to the weight and manufacturing costs of the grass cutting machine. A further disadvantage is that the cutting result will depend very much on the smoothness of the ground. Also, in the case of rugged or stony ground, it is difficult to control the movement of the grass cutting machine. It may be mentioned, also, that in the case of grass cutting machines in which the cutter is surrounded by an open bottomed hood, it is usually necessary to arrange the supporting rollers in such a manner as to keep the bottom edge of the hood at a considerable distance above the ground in order to prevent accidental bumping of the hood into the ground. It is therefore often felt necessary to provide protective screening means to prevent access to the interior of the hood under the bottom edge. Such screening means further add to the encumbrance, weight and manufacturing costs of the machine.

It is an object of the invention to provide a grass cutting machine in which the above mentioned drawbacks are eliminated or reduced.

According to the invention, in order to eliminate the necessity of supporting rollers or similar supporting structure, use is made of the so-called ground effect, i.e. the physical phenomenon that an object can be supported at a distance above the ground on a cushion of air produced by a flow of air generally directed towards the ground beneath the object. Thus, according to the invention, a grass cutting machine of the type referred to is provided with air impelling means to produce such a cushion of air under the machine.

Figure 1:
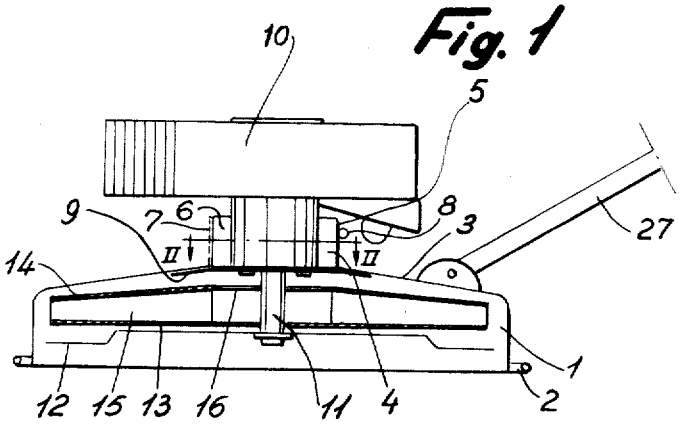
Figure 2:
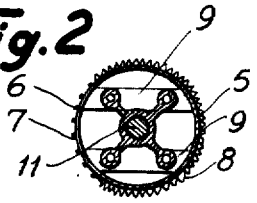
Figure 3:
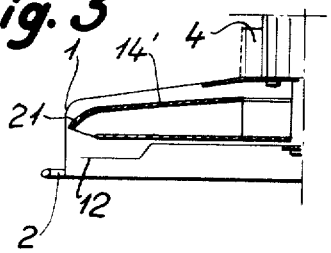
Figure 5:
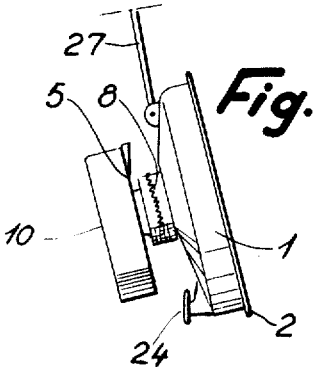
Figure 4:
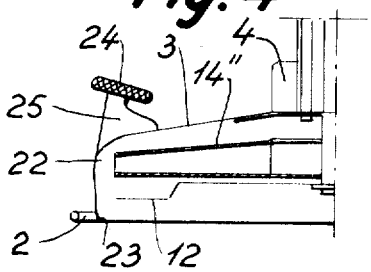

Other features, objects and advantages of the invention will be apparent to those skilled in the art from the following detailed description of one embodiment thereof and various modifications, reference being made to the accompanying drawings in which FIG. 1 shows a grass cutting machine partly in section, FIG. 2 a section along the line II—II in FIG. 1, FIG. 3 a partial section through the hood and the ventilator wheel showing a somewhat modified construction of the latter, FIG. 4 illustrates the provision of an auxiliary supporting roller on the top of the hood of the machine, and FIG. 5 illustrates the transportation of the machine in tilted position with stationary motor.

In the drawing, 1 is a hood which is constructed substantially in the form of a short cylinder. At one end of the hood, the edge of the latter is bent outwards and rolled upon itself to form a supporting rim 2 surrounding the open bottom of the hood. At its other end, the hood comprises a slightly domed roof or cover portion 3. Centrally of the cover portion 3 there is provided an opening 4, which is surrounded by an axial flange 5 forming an air inlet chamber. An air inlet opening 6 is provided along part of the circumference of the flange 5, said opening being covered by a protecting grid 7 which is held in position around the flange 5 by means of a spring 8. Two mutually parallel supporting bands 9 are mounted on the inner side of the cover portion 3 of the hood 1 in positions to extend across the opening 6, said supporting bands serving for the attachment of a motor 10 such as a gasoline operated engine. The shaft 11 of the motor 10 extends centrally into the hood 1 and carries a ventilating wheel and a cutter 12. According to FIGURE 1, the ventilating wheel or blower consists of two circular discs 13 and 14 having a plurality of substantially radially extending ventilator blades 15 mounted therebetween. Each of the ventilator blades 15 is wider at its end facing the shaft 11 than at its end remote therefrom. The upper circular disc 14 is provided with a central opening 16 for the intake of air.

FIGURES 3 and 4 show diametrical sections through two different forms of the ventilating wheel and the hood. In FIG. 3, the upper circular disc 14' is bent downwards at its periphery at 21, whereby a more powerful downward flow of air is obtained. In FIG. 4, the upper disc 14'' is slightly conical and the wall of the hood is constructed with a rounded portion 22 at the transition between the cover portion 3 and the cylindrical skirt portion extending downwards therefrom. Moreover, the bottom end of the hood is bent slightly inwards at 23 so that the mouth of the hood becomes somewhat restricted. In this manner the wall of the hood has a slight inward inclination along its inner edge and the flow of air discharged from the ventilator is deflected by the rounded portion 22 and the inclined wall portion of the hood towards the centre of the grass cutting machine, whereby the grass coming in under the flange 2 is automatically lifted so that the cutter 12 will cut more cleanly and efficiently.

FIG. 4 also illustrates the provision, on the top of the hood, of an inclined auxiliary supporting roller 24 which is mounted on the hood by means of a bracket 25. The supporting roller 24 is intended for facilitating the transportation of the grass cutting machine when its motor is stationary. The grass cutting machine is then tilted in such a maner that the whole of the machine is supported on the supporting roller 24, as illustrated in FIG. 5.

The hood is constructed with a handle bar 27 which is preferably connected to the portion of the hood diametrically opposite to the air intake opening 6 or 18 and the supporting roller 24.

In operation, when the motor of the grass cutting machine is started, a cushion of air is formed under the machine by the so-called ground effect, whereby the machine is supported on said air cushion at a small distance above the ground. The machine can easily be maneuvered by means of the handle bar 27, and a certain stabilization in the lateral direction is obtained by the fact that the air intake is directed in the presumed principal direction of movement of the machine.

It will be seen that in the embodiment shown, the ground effect is produced by means of a ventilator in the form of the centrifugal blower having distinct radial passages opening at a small distance from the peripheral wall of the hood, while the ends of the blades of the cutter, which form the principal cutting zone, are located substantially directly below the discharge openings of the passages. This fan is a radial discharge type blower as the conical-plate-fan type described in FIGURE 6 of page 335 in the publication Engineers' Illustrated Thesaurus, published 1952 by Chemical Publishing Co., Inc., New York, N.Y.

It might be expected that the power required for the operation of the ventilator or air impelling means would necessitate the use of a bigger and heavier motor than in known machines of the type considered, but in practice it has been found that this is not at all so. On the contrary, it has been found that a machine according to the invention, when equipped with a motor of a certain size, has a cutting capacity at least equalling that of a known machine supported on rollers, when equipped with an identical motor.

It has also been found that with a grass cutting machine constructed as described, ground effect of an appreciable value will be produced even if part of the area of the bottom opening of the hood is at a considerable distance from the ground, e.g. when grass is to be cut along the edge of a lawn which is elevated relative to the surroundings, or when grass cutting is to be effected on a curved or irregular surface of the soil. The reason for this probably is that the radial passages of the blower will produce positive flows of air down along the cylindrical wall of the hood so that ground effect will be produced along such edge portions of the hood as are at a small distance from the ground.

The supporting roller 14 need not necessarily be provided, but on the contrary will usually be superfluous in the case of lawn-mowers for ordinary garden work, since these will be sufficiently light-weight for carrying by hand. For larger size machines, however, the supporting roller is of interest though other means may also be used for the transportation of the machine. E.g., the machine may be constructed with a special carrying handle for transportation by one or two persons.

It will be understood that it is an advantage of the grass cutting machine according to the invention that no supporting means have to be provided outside the hood of the machine so that the machine may be run closer to trees and other obstacles than machines constructed with such supporting means. Moreover, special screens or other safety arrangements to prevent access to the interior of the hood under the bottom edge thereof are superfluous because in operation the edge will only be lifted slightly from the ground. For the same reason there is no danger of stones being hurled out from under the machine so that no safety measures have to be taken to safeguard against accidents arising therefrom.

The grass tops cut off by means of the blades will be blown out from under the machine by the same flow of air as that producing the ground effect, and will therefore be uniformly spread over a large area and will not collect in heaps necessitating raking of a lawn after it has been mowed.

Additional advantages of the new grass cutting machine are its simplicity of construction permitting the machine to be manufactured at low cost, as well as the reduced encumbrance of the machine for a certain cutting capacity, its low weight and its ease of operation.

I claim:

1. A grass cutting machine comprising a housing having a bottom opening, the peripheral edge of which is located substantially in a plane, a cutter mounted in said housing, driving means for said cutter, and a radial discharge type fan driven by said means for producing a flow of air radially to strike the housing and flowing out through said bottom opening therefrom along the peripheral edge at rates suitable for keeping said peripheral edge at a small distance above the ground by ground effect.

2. A grass cutting machine comprising a housing having a bottom opening *for passing over the ground,* the peripheral edge of which is a rim *formed from the housing material and* located substantially in a plane *horizontal to the ground thereby suitable for sliding on the ground,* a rotary air impeller mounted on a shaft in said housing, a rotary cutter mounted in said housing below said air impeller on the same shaft, and driving means for said rotary air impeller and said rotary cutter, said air impeller being constructed to expel air through said bottom opening along paths and at rates suitable for slightly elevating said housing and parts carried thereby from the ground by ground effect.

3. A grass cutting machine as in claim 2, in which said impeller is constructed to discharge into a zone in said housing located above said cutter and substantially radially outside the operating area thereof.

4. A grass cutting machine comprising a housing having a substantially vertical cylindrical wall defining a cylindrical compartment within said housing and terminated at its bottom with a substantially circular edge, a centrifugal blower mounted substantially co-axially in said cylindrical compartment and constructed with radial passages having their outlet ends located at a small distance from said cylindrical wall, a rotary cutter mounted in said cylindrical compartment below and coaxially with said blower, common driving means for said centrifugal blower and said rotary cutter, said rotary cutter being constructed with blades having their ends located at a small distance from said cylindrical wall, said centrifugal blower being constructed to discharge air at a rate sufficient for slightly elevating said housing and parts carried thereby from the ground by ground effect.

5. A grass cutting machine comprising a hood having a top cover portion and a skirt portion, the latter being substantially shaped as a vertically disposed cylinder *devoid of internally protruding air path modifying portions* terminated at its bottom with a supporting rim, a motor attached to said top cover portion, said motor having a vertical shaft extending into the space within said skirt portion, an air impeller mounted on said shaft, a rotary cutter mounted on said shaft below said air impeller, an air inlet opening disposed centrally of said top cover portion, said air impeller being construced to suck in air through said air inlet opening and to expel air through the open bottom of said hood at a rate sufficient to slightly elevate the assembly of said hood, motor, air impeller and rotary cutter from the ground by ground effect, *wherein said vertically disposed cylinder has a tapered wall.*

6. A grass cutting machine comprising a hood having a top cover portion and a skirt portion, the latter being terminated at its bottom with a supporting rim, a rotary radial discharge type fan air impeller mounted in said hood, a rotary cutter mounted in said hood below said air impeller, means for driving said rotary air impeller and said rotary cutter, an air inlet on the top of said top cover and connecting with a central opening thereof, said air inlet having a laterally disposed air intake opening, said air impeller being constructed to suck in air through said air inlet to discharge the air radially against said skirt portion and to expel air through the open bottom of said hood at a rate sufficient to slightly elevate the assembly of said hood, driving means, air impeller and rotary cutter from the ground by ground effect.

7. A grass cutting machine as in claim 6 comprising a protecting grid to cover said lateral air intake opening.

8. A grass cutting machine comprising a hood having a top cover portion and a skirt portion, the latter being terminated at its bottom with a supporting rim, a rotary air impeller mounted in said hood, a rotary cutter mounted in said hood below said rotary air impeller, driving means for said rotary air impeller and said rotary cutter, a radially disposed inlet passage provided outside said top cover and connecting with a centrally disposed opening thereof, said radially disposed passage having an intake opening at the end thereof remote from said opening of the cover portion, said rotary air impeller being arranged to suck in air through said passage and said opening of the cover portion and to expel air through the open bottom of said hood at a rate sufficient to slightly elevate the assembly of said hood, driving means, air impeller and rotary cutter from the ground by ground effect.

9. A grass cutting machine as in claim 8 comprising a protecting grid to cover said air intake opening.

10. A grass cutting machine as in claim 1 comprising a handle bar pivoted to said housing for pivoting about a substantially horizontal axis.

11. A grass cutting machine as in claim 1 and further comprising an auxiliary supporting wheel mounted on the top of said housing and having its axis directed at an angle to permit said housing to be supported on said roller in a tilted position for transportation.

12. A wheelless grass cutting machine *comprising a hood with a rim portion thereof extending in a horizontal plane to ride substantially parallel above the ground surface, said hood* having *affixed thereto* a power operated rotary cutter with [and] commonly driven air impelling means *disposed within the hood* for producing ground effect to support said machine on a cushion of air at a distance above the ground.

13. A grass cutting machine comprising a hood having a top cover portion and a skirt portion, the latter being terminated at its bottom with a smooth supporting rim located in a plane and being of a cross-sectional shape suitable for sliding on the ground, a radial discharge type blower mounted in said hood on a shaft perpendicular to the plane of said rim, a rotary cutter mounted on said shaft below said blower, and a driving motor for said shaft.

*14. A machine as defined in claim 2 wherein said rotary air impeller comprises a fan of the radial discharge type.*

*15. A machine as defined in claim 2 wherein said impeller directs air selectively down along the wall of said housing so that the ground effect will be produced along such edge portions of the housing as are at a small distance from the ground.*

*16. A machine as defined in claim 2 wherein the parts carried within said housing consist of only the shaft, the air impeller and the rotary cutter.*

*17. A machine as defined in claim 2 wherein said housing has a domed roof.*

*18. A machine as defined in claim 5 wherein said opening is covered by a protective grid.*

*19. A machine as defined in claim 5 wherein the tapered wall is inwardly directed to restrict the opening of said hood.*

*20. A machine as defined in claim 12 wherein said air impelling means is of a radial discharge type.*

*21. A machine as defined in claim 12 wherein the hood is constructed substantially in the form of a short cylinder with a partially closed top.*

*22. A machine as defined in claim 21 wherein there is disposed within the hood only a shaft having affixed thereto for rotation said air impelling means and a rotary cutter blade.*

*23. A machine as defined in claim 21 wherein at the open end of the hood the edge is directed outward to form a supporting rim located in a plane substantially parallel with the ground and suitable for sliding on the ground.*

References Cited

The following references, cited by the Examiner, are of record in the patented file of this patent or the original patent.

UNITED STATES PATENTS

| | | |
|---|---|---|
| 2,796,714 | 6/1957 | Denney. |
| 2,862,376 | 12/1958 | Thelander. |
| 3,050,146 | 8/1962 | Crim. |

FOREIGN PATENTS

| | | |
|---|---|---|
| 219,133 | 11/1958 | Australia. |

ANTONIO F. GUIDA, Primary Examiner

U.S. Cl. X.R.

56—Dig 3